(12) United States Patent
Large (10) Patent No.: US 11,016,336 B2
(45) Date of Patent: May 25, 2021

(54) BRAGG GRATING-BASED DISPLAY FILTERING

(71) Applicant: Microsoft Technology Licensing, LLC, Redmond, WA (US)

(72) Inventor: Timothy Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 494 days.

(21) Appl. No.: 15/042,608

(22) Filed: Feb. 12, 2016

(65) Prior Publication Data

US 2017/0235188 A1    Aug. 17, 2017

(51) Int. Cl.
*G02F 1/1335* (2006.01)
*G02F 1/1334* (2006.01)
*G02F 1/13357* (2006.01)

(52) U.S. Cl.
CPC ...... *G02F 1/133555* (2013.01); *G02F 1/1334* (2013.01); *G02F 1/13342* (2013.01); *G02F 1/133504* (2013.01); *G02F 1/133509* (2013.01); *G02F 1/133606* (2013.01); *G02F 1/13345* (2021.01); *G02F 1/133521* (2021.01); *G02F 1/133623* (2021.01); *G02F 1/133626* (2021.01); *G02F 2201/307* (2013.01); *G02F 2203/25* (2013.01); *G02F 2203/58* (2013.01); *G02F 2203/62* (2013.01)

(58) Field of Classification Search
CPC combination set(s) only.
See application file for complete search history.

(56) References Cited

U.S. PATENT DOCUMENTS

| | | | |
|---|---|---|---|
| 5,044,736 | A | 9/1991 | Jaskie et al. |
| 5,587,816 | A | 12/1996 | Gunjima et al. |
| 5,686,979 | A | 11/1997 | Weber et al. |
| 5,877,829 | A | 3/1999 | Okamoto et al. |
| 5,986,730 | A | 11/1999 | Hansen et al. |
| 6,765,550 | B2 | 7/2004 | Janick et al. |
| 6,842,209 | B2 | 1/2005 | Sumiyoshi et al. |
| 7,675,598 | B2 | 3/2010 | Hong |
| 7,965,268 | B2 | 6/2011 | Gass et al. |

(Continued)

FOREIGN PATENT DOCUMENTS

| | | |
|---|---|---|
| DE | 102013103539 A1 | 10/2014 |
| EP | 1312972 A1 | 5/2003 |
| WO | 0120406 A1 | 3/2001 |

OTHER PUBLICATIONS

"International Search Report and Written Opinion Issued in PCT Application No. PCT/US2017/016316", dated May 30, 2017, 19 Pages.

(Continued)

*Primary Examiner* — Lauren Nguyen
(74) *Attorney, Agent, or Firm* — Ray Quinney & Nebeker P.C.; John O. Carpenter (57) ABSTRACT

A display includes a display modulation layer, a backlight unit configured to generate light for illumination of the display modulation layer, and a filter film disposed between the backlight unit and the display modulation layer. The filter film includes a plurality of Bragg grating sets. Each Bragg grating set is configured to reflect the light in a wavelength-selective and angular-selective manner rearward toward the backlight unit.

20 Claims, 4 Drawing Sheets

(56) References Cited

U.S. PATENT DOCUMENTS

| | | | |
|---|---|---|---|
| 2002/0080466 A1* | 6/2002 | Bayart | G02F 1/1334 359/295 |
| 2004/0174477 A1 | 9/2004 | Okamoto et al. | |
| 2004/0252373 A1 | 12/2004 | Umeya | |
| 2005/0018272 A1* | 1/2005 | Kimura | G02B 26/02 359/295 |
| 2007/0285775 A1 | 12/2007 | Lesage et al. | |
| 2008/0055523 A1 | 3/2008 | Nishihara et al. | |
| 2009/0067156 A1 | 3/2009 | Bonnett et al. | |
| 2009/0201571 A1* | 8/2009 | Gally | G02B 6/0041 359/315 |
| 2010/0177025 A1* | 7/2010 | Nagata | G02B 6/0028 345/76 |
| 2012/0268809 A1 | 10/2012 | Guo et al. | |
| 2015/0138059 A1 | 5/2015 | Large et al. | |
| 2015/0192725 A1* | 7/2015 | Facke | G02B 6/0035 362/606 |

OTHER PUBLICATIONS

Creemers, et al., "26.5: Requirements on Backlights for LCDs with Transmissive Cholesteric Color Filters", In the Proceedings of Society for Information Display's Symposium Digest of Technical Papers, vol. 33, Issue No. 1, May 21, 2002, pp. 878-881.

Behzad Sajadi et al., "Switchable Primaries Using Shiftable Layers of Color Filter Arrays", Journal of ACM Transactions on Graphics, Jul. 2011, 10 pages, vol. 30, Issue 4.

* cited by examiner

BRAGG GRATING-BASED DISPLAY FILTERING

DESCRIPTION OF THE DRAWING FIGURES

For a more complete understanding of the disclosure, reference is made to the following detailed description and accompanying drawing figures, in which like reference numerals may be used to identify like elements in the figures.

The disclosed devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

A display of an electronic device has a backlight unit to illuminate a liquid crystal display (LCD) panel. The backlight unit emits light over angles wide enough to give rise to privacy concerns. Off-axis viewers, such as an individual sitting in a neighboring airplane seat, may be capable of observing sensitive information. The display includes a filter that reflects light from the backlight unit in a wavelength-selective and angular-selective manner. The effective viewing angle of the display may thus be controlled, thereby addressing the privacy concerns. The privacy filtering is provided in some cases without reducing on-axis display luminance.

The filter is a wavelength-selective, reflective filter disposed between the backlight unit and the LCD panel. The filter includes a number of Bragg grating sets in one or more films. Each Bragg grating set is configured to reflect a certain bandwidth (color) of light propagating within a range of off-axis angles. The off-axis angles may fall beyond a predetermined, desired range of viewing angles for the display. For example, light propagating at angles in a range from about 30 degrees to about 40 degrees relative to the display normal may be reflected. The user of the display thus sees the display normally, but off-axis viewers see the content modulated by strong color variations.

A respective Bragg grating set may be provided to address each direction of possible, undesired wide-angle (or off-axis) viewing. For example, a respective Bragg grating set is provided for reflecting light propagating to the left side of the display, and further sets are provided for the directions associated with right, top and bottom sides of the display. Collectively, the Bragg grating sets may form a photonic lattice, or crossed grating, structure in the film in which the gratings are written or otherwise formed.

The filtering is integrated with the other components of the display. The filter film(s) is incorporated inside the display. A separate privacy screen is therefore avoided. The lack of a privacy screen or other overlay may be useful in connection with, for instance, touchscreen displays. For example, parallax and other issues presented by such screens are thereby avoided because the distance between the touch surface and the display surface is not increased.

In some cases, the privacy feature of the display is switchable. The nature of the filtering allows the filter to be masked by a switchable diffuser. The activation and deactivation of the diffuser toggles the display between a privacy mode and a wide-angle viewing mode. The diffuser is disposed between the filter and the LCD panel. When activated, the diffuser spreads on-axis and other non-reflected light across the narrow range of angles and wavelengths blocked by the filter. The viewing angle of the display is thus switchable or adjustable.

The integrated filtering may be achieved without introducing optical losses (or with minimal optical losses). An ideal Bragg grating set provides wavelength and angular selectivity with zero optical loss. In practice, a small amount of on-axis light may be reflected. But the displays may compensate for, if not reverse, any such losses through recycling of the reflected light. Any reflected light may be again reflected by, for instance, diffusing elements in the backlight unit. The light is thus given another chance to be incident upon the gratings in a different direction. The recycled light may eventually be directed outward from the backlight unit sufficiently on-axis to pass through the filter. The on-axis luminance, or brightness level, of the display may accordingly increase (rather than decrease) due to the filter. The increased on-axis luminance comes at the expense of decreased off-axis luminance. Greater illumination at narrower viewing angles may, in turn, provide an opportunity to reduce the power consumption of the display, as less light is wasted illuminating areas outside of those seen by the user.

Significant on-axis losses are also avoided because the Bragg gratings of the filter are configured to suppress or block on-axis light at wavelengths not relied upon by the display. The reflection characteristic of the Bragg gratings is a function of both incidence angle and wavelength. To avoid undesirable reflection, the range of wavelengths reflected by the filter for on-axis light (or other narrow-angled light) may fall between the wavelengths relied upon by the display. For example, on-axis light having a wavelength between the primary red, green and blue wavelengths produced by the backlight unit may be reflected without adversely impacting the on-axis luminance of the display.

Although described in connection with electronic devices having touchscreens, the internal support may be used in connection with a wide variety of electronic devices, including those not having a touch-sensitive display. The size and form factor of the electronic device may vary considerably. Devices may range from wearable or handheld devices to televisions or other wall-mounted displays or other large-scale devices. The composition and other characteristics of the other components of the display module and the electronic device may vary accordingly.

Figure 1:
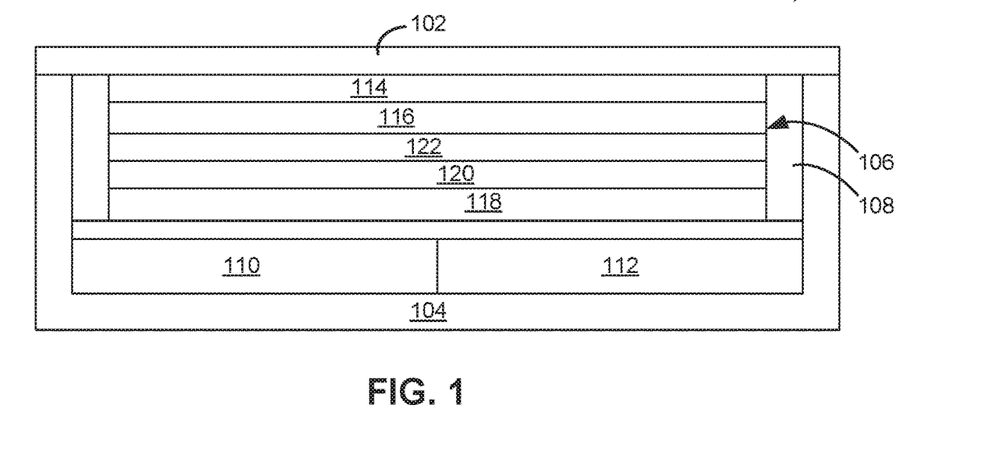
FIG. 1 is a partial, schematic, cross-sectional view of an electronic device having a display with integrated privacy filtering in accordance with one example.

FIG. 1 is a cross-sectional view of an electronic device 100 having a transparent cover 102, a shell 104, and a display module 106 (or module of a display) disposed between the transparent cover 102 and the shell 104. The display module 106 includes a number of constituent films or other components. The films may be arranged in a stack under the transparent cover 102 as shown. In this example, the constituent films of the display module 106 are carried or otherwise supported by an internal frame 108. In some cases, the internal frame 108 is positioned along a periphery of the films, e.g., along an inner surface of the shell 104. The positioning of the internal frame 108 and, accordingly, the constituent films of the display module 106 may vary.

The electronic device 100 includes a battery 110 and an electronics module 112. The battery 110 and the electronics module 112 may be mounted within the shell 104 in various ways. For ease in illustration, the battery 110 and the electronics module 112 are depicted in FIG. 1 as supported by a bottom panel of the shell 104. In other cases, one or both of the battery 110 and the electronics module 112 may be mounted on a circuit board and/or other internal support.

The transparent cover 102 may include or be composed of glass, plastic, and/or other transparent materials. The transparent cover 102 may thus be referred to as a cover glass. In some cases, one or more components of the display module 106 may be affixed to, or otherwise carried by, the transparent cover 102. For example, touch sensor elements may be applied to the transparent cover 102. The transparent cover 102 may be integrated with the display module 106 in some cases. For instance, the transparent cover 102 may include and/or be configured as a polarizer. Alternative or additional optical elements may be provided via the transparent cover 102.

The display module 106 may be configured as a stack of layers, films, or other components. The display module stack 106 may include any number of optical layers or films. Any number of the layers of the display module 106 may be structurally supported by the internal frame 108. In this example, the display module 106 includes a touch sensor unit 114, a display modulation layer 116, and a backlight unit 118 configured to generate light for illumination of the display modulation layer 116. Each unit 114, 116, 118 is schematically depicted in FIG. 1 as a single layer for ease in illustration. Each unit 114, 116, 118 may be a composite structure or layer including any number of constituent films and/or other components. The display module 106 may include any number of adhesive films or other intermediary layers disposed between or within the units shown.

Some of the components of the display module 106 may be integrated with one another. For example, a constituent component of one of the units 114, 116, 118 may be formed on or in, or be otherwise integrated with a constituent component of another one of the units 114, 116, 118. For example, the touch sensor unit 114 may include one or more components or layers formed on, applied to, or otherwise secured to the LCD unit 116 and/or the transparent cover 102.

The display modulation layer 116 may be or include a liquid crystal display (LCD) panel or unit. The LCD unit or other display modulation layer 116 may include one or more layers disposed between the touch sensor unit 114 and the backlight unit 118. The display modulation layer 116 may thus be a composite structure or layer. Other types of display modulation layers may be used. For example, an electrowetting display layer may be used. A variety of light modulation techniques may be used. As a result, any number and various types of optical films may be included in the display modulation layer 116.

The backlight unit 118 may also include one or more light management films or other layers. For example, the backlight unit 118 may include a light guide layer (or plate) with one or more light management films on either side thereof. The light management films may be configured for reflection, diffusion, and/or extraction of the light generated by a light source of the backlight unit 118. The light management films may be adhesively secured to front and rear faces of the light guide plate. The backlight unit 118 may include any number of light management films or layers.

The backlight unit 118 also includes a number of light sources. The light sources may be edge-mounted, e.g., along an edge of the light guide plate. The light sources may be carried or otherwise supported by the frame 108. Each light source may be or include a light emitting diode (LED). Other types of light sources may be used.

The display module 106 includes a filter 120 to reflect a bandwidth of light propagating at wide angles relative to the display normal. In this example, the display module 106 also includes a diffuser layer 122 to allow the display module 106 to have privacy and wide-angle viewing operational modes. Both the filter 120 and the diffuser layer 122 are disposed between the backlight unit 118 and the display modulation layer 116. The diffuser layer 122 is disposed between the filter 120 and the display modulation layer 116. As a result, light generated by, and extracted from, the backlight unit 118 encounters the filter 120, and then the diffuser layer 122, before illuminating the display modulation layer 116.

The filter 120 includes a number of Bragg grating sets. Each Bragg grating set is configured to reflect the light generated by the backlight unit 118 in a wavelength-selective and angular-selective manner rearward toward the backlight unit 118. To provide the privacy filtering, each Bragg grating set is configured to reflect a bandwidth of the light rearward toward the backlight unit 118 when the light is propagating at off-axis angles beyond a predetermined range of viewing angles for the display. Examples of Bragg grating sets are shown and described in connection with FIGS. 5 and 6.

Each Bragg grating set includes a series of grating structures (e.g., holographic structures) written into the film(s). Each grating structure presents or includes a variation in refractive index. The bandwidth and efficiency of the holographic structure is determined by the maximum change in refractive index and the structure depth. Collectively, the grating structures thus present a repetitive series of planes of high and low refractive index (or other index variation) in one direction. The planes of each Bragg grating set are oriented in a respective direction. Multiple sets of planes in respective directions may be overlaid on each other within the same film.

The filter 120 may be written in, or include, a photopolymer film, such as bleached silver halide, one of the Holographic Recording Films (HRF) available from DuPont, or the Bayfol HX film available from Bayer. The photopolymer films, such as Bayfol HX, at a 50 micron thickness, have sufficient modulation capability to record multiple (e.g., four) high efficiency holograms (one for each viewing direction, as described below). Other types of photo-sensitive films may be used. Alternatively, the filter 120 may be formed directly in a liquid crystal/polymer matrix by selective polymerization. An example of such a process is the polymer-liquid crystal-polymer slice (POLYCRIPS) structure and process developed at the University of Calabria in Italy, in which each Bragg grating structure is formed from alternating polymer and liquid crystal layers by direct exposure to a laser source. In this case, the filter 120 may be switched on and off directly between a reflective mode and a transparent mode.

Each series of grating structures is highly reflective in an angular-selective and wavelength-selective manner. The performance of such structures are given by Kogelnik's equations or, more generally, by a reduced form Maxwell's equations. Each series reflects off-axis light back to the backlight unit 118 when light is incident upon the set at an angle such that the spacing between the refractive index variations is one half of the wavelength of the incident light. Each series of grating structures is configured to reflect a particular bandwidth of light (the reflected bandwidth) over a particular range of angles relevant to the privacy issue. The grating structures are configured such that the reflected bandwidth falls on one of the display colors (e.g., red, green, or blue). An off-axis viewer sees an image with strong coloration because one of the colors is rejected by the grating structures. For example, and as described further below in connection with the examples of FIGS. 7 and 8, if the grating structures reject the color green, then the off-axis viewer sees a color-distorted (or re-colored), predominantly magenta, representation of the display image.

Incident light in the reflected bandwidth travelling along the display normal (e.g., the normal to the surface of the filter 120) is not affected. Instead, the grating structures are tuned or configured such that the wavelengths that are reflected by the grating structures for light travelling along the display normal are not relevant to the display. As a result, an on-axis viewer sees an image without adverse coloration. Examples of such filter tuning are described below in connection with FIGS. 7 and 8.

A single set of Bragg gratings provides such reflectivity for light angled from the surface normal in one direction. For example, one set reflects light propagating at about 30 degrees from the surface normal toward the left side of the display. A second set of grating structures may then be added to complete the left-right symmetry so that viewers to both the left and right are blocked. Thus, any number of multiple Bragg grating sets may be included in the filter 120 to provide reflective behavior in multiple directions. The multiple directions correspond with the multiple directions in which off-axis viewing of the display may occur. In one case, a further pair of grating structures may be written in the orthogonal direction, as described below in connection with the examples of FIGS. 4-6. For example, the off-axis viewer may be located on the left, right, top, or bottom side of the display. The Bragg grating sets may be written in the same film or multiple films.

When extended to multiple (e.g., three) dimensions, the Bragg grating sets may exhibit a periodic structure, or lattice. If the planes of the grating structures represent areas of high refractive index, then the resulting intersections of four planes form a photonic lattice. The filter 120 may thus be considered a photonic lattice filter. In one case, the structure includes the intersection of four sets of grating structures. Two sets are configured to reflect light propagating off-axis to the left and right sides of the display (e.g., +/−30 degrees left-right). The other two sets are configured to reflect light propagating to the top (upper) and bottom (lower) sides of the display (e.g., +/−30 degrees up-down). In other cases, only two sets of planes may be included for reflections of off-axis light propagating in, for instance, the left-right directions.

The reflected light may be recycled. In some cases, the reflected light is reflected again within the backlight unit 118 after being reflected rearward by the filter 120. For instance, the reflected light may be incident upon an extraction film or other element of the backlight unit 118 that redirects the light forward. The light then encounters the filter 120, at which point the light is either reflected backward again, or allowed to pass through. Eventually, the light may be directed on-axis along or near the surface normal. The reflected light may thus increase the on-axis luminance of the display.

Each Bragg grating structure is disposed along a respective plane within the film. The grating structure may be a continuous plane or patterned. The patterning may be configured to display an off-axis image via the light not reflected by the filter 120. The patterning of the gratings may differ or vary between the sets.

The angular selectivity may differ between the Bragg grating sets. For example, one set may have grating structures separated by a first spacing, while another set has grating structures separated by a second spacing differing from the first spacing. The difference may be directed to addressing the angles at which undesired viewing may occur. For example, blocking viewers to the left and right of the display may be set for about 30 degrees, while viewers below the display may be blocked at about 35 degrees (e.g., plus/minus 5 degrees). In that way, users of a tablet lying on a horizontal surface may remain able to see the correct display image even when viewing at angles of about 25-30 degrees. Blocking viewers above the display may be set for either one of the aforementioned angles, or a different angle.

Off-axis angles above the range of reflected angles are not an issue. For instance, the backlight unit 118 may not be capable of emitting much light at off-axis angles above about 35 or 40 degrees. Moreover, an off-axis viewer located at such angles is typically too far away from the display to read or see the displayed image.

The spacing may vary within a respective Bragg grating set. For instance, one or more of the Bragg grating sets may be configured as a chirped grating set. In such cases, the spacing between adjacent grating structures varies across the set so that the range of wavelengths, or bandwidth, reflected by the set is broadened. Additional or alternative options for broadening the bandwidth may also be used. For example, a Bragg grating may have a variation in spatial frequency such that red, green and blue primary wavelengths of the display are all reflected, e.g., by concatenating sub-gratings of different ½ wavelength spacing.

The diffuser layer 122 provides an option to mask, or cancel, the filtering provided by the filter 120. The diffuser layer 122 is switchable between operative and non-operative modes to allow the display module 106 to switch between a privacy mode and a wide-view mode. The diffuser layer 122 is dispose between the filter 120 and the display modulation layer 114. Light passing through the filter 120 thus encounters the diffuser layer 122. When operative, the diffuser layer 122 diffuses the light passing through the filter 120. As a result, light is redirected toward the angles blocked by the filter 120. When not operative, the diffuser layer 122 has no effect on the light passing through the filter 120.

The diffuser layer 122 may include a polymer network liquid crystal (PNLC) film. For example, the switchable diffusers commercially available from Ashai Glass Company (AGC) as Asahi Transmart are suitable. The PNLC film is very transmissive without any power applied thereto. The privacy mode may thus be implemented without any battery or other power consumption. Other diffuser layers and materials may be used. For example, a polymer dispersed liquid crystal (PDLC) film may be used. In still other cases, switchable Bragg gratings are disposed and integrated within the display modulation layer (e.g., LCD layer) to provide both the filtering and switching functions, as described above in connection with, for instance, POLYCRIPS structures. Further details regarding examples having switchable Bragg gratings are provided below in connection with FIG. 4.

In the example of FIG. 1, the filter 120 is provided in a single, discrete film or layer. Additional films or layers may be used to provide the filter 120 in other cases. For example, each Bragg grating set may be disposed in a separate, respective film or layer.

Adjacent units, layers or other elements or components of the display module 106 may be bonded together or otherwise secured to one another. For example, the touch sensor unit 114 may be bonded to the LCD panel 116. The LCD panel 116, may, in turn, may be bonded to the diffuser layer 122. The adhesive layers are not shown for ease in illustration. Optically clear adhesive may be used. The display module 106 may also be bonded or otherwise secured to the transparent cover 102. In some cases, adjacent layers or films are not bonded or secured to one another. Adjacent units or panels of the display module 106 may thus be contiguous or in contact with one another—e.g., without an adhesive layer therebetween.

The electronic device 100 may include fewer, additional, or alternative display-related components. For example, in some cases, one or more components of the display module 106 may also serve as the transparent cover 102. For instance, rather than having a separate, additional cover, one of the layers or components of the display module may be used as an external display layer. For example, the external display layer may be or include an external polarizer of the LCD panel 116. The external polarizer may include a hard coating (e.g., powdered or nano-scale glass in a polymer binder) for protection during use. Alternatively or additionally, a color filter glass layer of the LCD panel 116 may be configured and disposed to act as a glass substrate for the external display layer. In such cases, a touch sensor layer may be formed upon or added to the color filter glass layer in an in-cell touch sensor arrangement. Other touch display arrangements may be used.

The construction and configuration of the device 100 may vary from the example shown in FIG. 1. For instance, the transparent cover 102 may be integrated with one or more components of display module 106. The display module 106 itself may also vary considerably. For example, the display module 106 may or may not be configured as a touchscreen. Different types of display technologies may be used, including, for instance, various types of LCD displays, such as super-twisted nematic and other twisted nematic LCD displays, and various thin-film transistor (TFT) displays.

Figure 2:
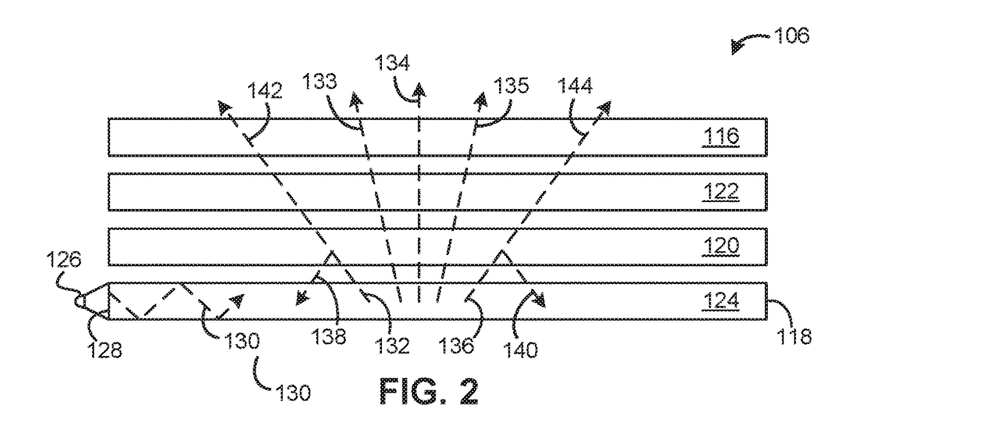
FIG. 2 is a partial, schematic, cross-sectional view of the display of FIG. 1 during operation in a privacy mode in accordance with one example.

FIG. 2 shows a portion of the display module 106 during operation to depict the manner in which the privacy filtering is provided. In this example, the backlight unit 118 includes a light guide layer (or plate) 124 and one or more light sources 126 (e.g., LED sources) to inject light into the light guide layer 124. The light source(s) 126 and the concentrator(s) 128 are disposed along one or more edges 128 of the light guide layer 124. The light sources 126 may be disposed along two opposing edges of the light guide layer 124. The positioning of the light sources 126 may vary. For instance, the backlight unit 118 may include planar light sources distributed along the rear face of the display module 106.

The light 130 injected into the light guide plate 124 initially undergoes total internal reflection (TIR) between a front face and a rear face of the light guide layer 124. The front face corresponds with the upper or forward facing side of the light guide layer 124, which is closer or proximate to the user. The rear face corresponds with the lower or rearward facing side of the light guide layer 124, which is farther or distal from the user. Eventually, the light 130 is extracted from the light guide layer 124 as a result of, for instance, an encounter with one of a number of extraction features of the backlight unit 118.

FIG. 2 shows five examples of rays 132-136 of extracted light. A variety of different types of extraction features and techniques may be used. The light guide layer 124 may accordingly be composed of a variety of different types of plates or other films, such as various optical polycarbonate films. In some cases, the light guide layer 124 is an acrylic or polycarbonate plate and the films are formed on a polyethylene terephthalate (PET) substrate with surface features made in urethane-based replication resins. The structures, arrangements, materials, and other characteristics of the light guide layer 124 and extraction features may vary.

For ease in illustration, the light 130 and, thus, each ray 132-136 is depicted as initially composed of white light. In some cases, the light 130 may be generated by white LED light sources, such as those involving blue LED devices and broad spectrum yellow phosphors. Alternatively, the backlight unit 118 includes separate red, green, and blue LED light sources. In either case, the light 130 and, thus, the rays 132-136, may accordingly include roughly equal amounts of red, green, and blue light.

In the example of FIG. 2, the rays 132, 136 are propagating within a predetermined range of off-axis angles that are blocked or suppressed by the filter 120. In some cases, the range is about 30 degrees, plus or minus about 5 degrees. The angles are measured relative to the display normal, which corresponds with the path of the ray 134. Because the rays 132, 136 fall within the blocked angle range, the filter 120 reflects a certain bandwidth of light 138, 140 rearward toward the backlight unit 118. In one example, the filter 120 is configured to reflect green light, and allow light 142, 144 containing blue and red wavelengths to pass through. Without the green bandwidth, viewers to the left and right (or other sides) of the display 106 thus see a color-distorted (e.g., magenta) image rather than the correct image. The range of off-axis angles blocked by the filter 120 may vary as desired. Blocking the green wavelengths may be useful because the human eye is most sensitive at those wavelengths. Without those wavelengths, the human eye will have considerable difficulty reading or discerning any remaining images.

The rays 133-135 are sufficiently on-axis so as to not be affected by the filter 120. The rays 133-135 accordingly pass through the filter 120 without significant reflection, if any. The rays 133-135 thus remain white, retaining all color components (e.g., red, green, and blue), before modulation by the light modulation layer 116. The user is therefore able to see the correct image, e.g., without any coloration by the filter 120.

In FIG. 2, the diffuser 122 is switched to a privacy mode of operation. In that mode, the diffuser 122 is deactivated. The various rays 133-135, 142, 144 pass through the diffuser 122 without any spreading, scattering, or other diffusion, as shown. The rays 133-135 eventually reach the light modulation layer 116 for processing to depict a desired image to the user. The rays 142, 144 also reach the light modulation layer 116 but have already been filtered of certain (e.g., green) light, thereby distorting the image seen by the off-axis viewers. The off-axis image is color-distorted regardless of the content modulation introduced by the light modulation layer 116.

Figure 3:
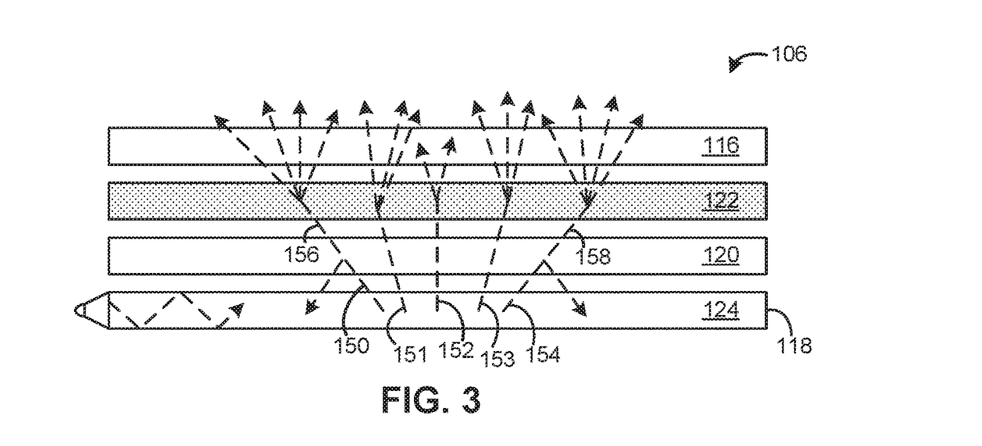
FIG. 3 is a partial, schematic, cross-sectional view of the display of FIG. 1 during operation in a wide-angle viewing mode in accordance with one example.

FIG. 3 shows the display module 106 during a wide-angle viewing mode of operation. The diffuser 122 is activated in this operational mode. White rays 150-154 are extracted from the light guide layer 124. Of those, the rays 150, 154 are sufficiently off-axis to be filtered by the filter 120, thereby producing color-modulated light rays 156, 158. The remaining rays 151-153 pass through the filter 120 unaffected. In this operational mode, all of the rays 151-153, 156, 158 (or at least a significant subset thereof) are then scattered upon encountering the diffuser 122 as shown. The resulting scattered light is thus spread over the entire angular spectrum of the display module 106, including the off-axis range of angles affected by the filter 120. As a result, the viewers positioned in the off-axis angular range will see an undistorted image. Wide-angle viewing is thus achieved despite the reflective blocking of the filter 120 of the rays 150, 154.

Figure 4:
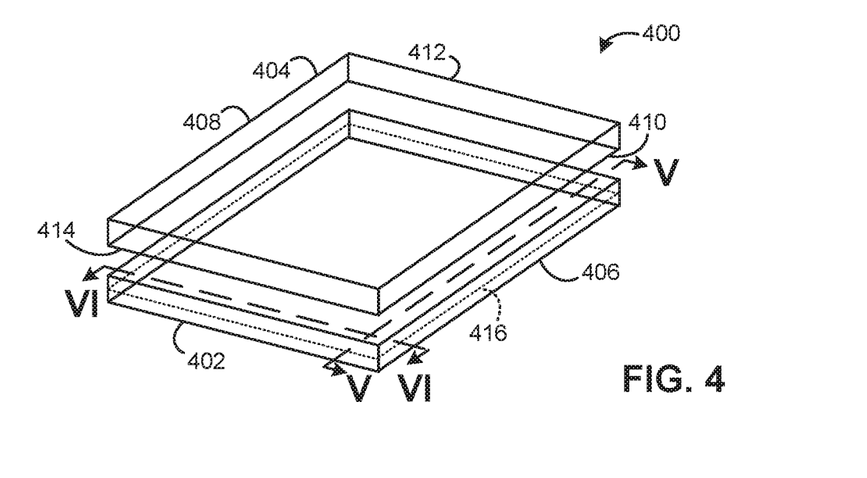
FIG. 4 is a partial, schematic, perspective view of a display with integrated privacy filtering in accordance with another example.

FIG. 4 depicts a portion of a display module 400 with integrated switchable filtering without a separate diffuser. The display module 400 includes a filter 402 and an LCD unit 404 (or other display modulation layer). In this case, without a separate diffuser, the filter 402 is adjacent to the LCD unit 404. For example, the filter 402 may be contiguous, or in contact, with the LCD unit 404.

The perspective view of FIG. 4 shows the lateral extent of the LCD unit 404, which may establish a viewing area for the display module 400. In this example, the viewing area may correspond with a tablet or laptop display. The viewing area has borders 408, 410, 412, 414. In one portrait viewing mode of, for instance, the tablet display, the borders 408, 410, 412, 414 correspond with the left, right, top, and bottom borders of the viewing area. However, the borders 408, 410, 412, 414 are associated with different sides as the tablet is rotated to another orientation, such as a landscape viewing mode or another portrait viewing mode.

The filter 402 includes a respective Bragg grating set to reflect a bandwidth of light propagating at off-axis angles toward each border 408, 410, 412, 414. The off-axis angles are beyond a predetermined range of viewing angles for the display, such as less than about 25 degrees. The range of angles blocked or suppressed by the filter 402 may or may not differ between the respective border directions. For instance, in tablet examples, the same range of angles may be blocked or suppressed because the tablet orientation varies during use. In contrast, different ranges of angles may be blocked in some laptop examples, such as those in which the orientation of the display does not vary during use.

The display module 400 provides switchable diffusion without a separate diffuser. In this example, the filter 402 includes switchable Bragg gratings schematically represented at 416 to provide switchable diffusion of the light passing through the filter 402. The switchable Bragg gratings 416 may be formed via the POLYCRIPS process as described above. Without a separate diffuser film, the LCD unit 404 may be contiguous or in contact with the film 406 of the filter 402.

Figure 5:
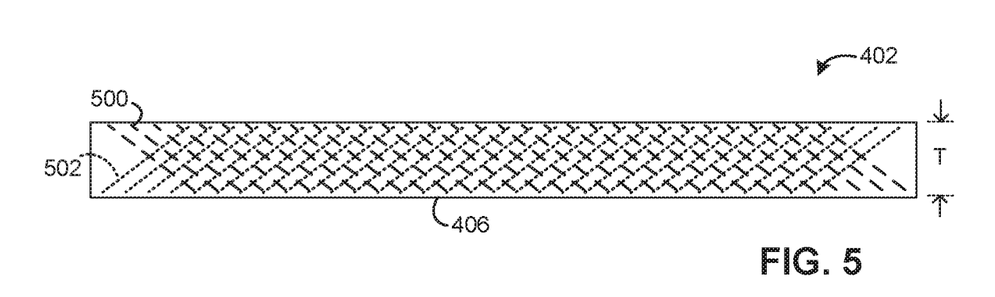
FIG. 5 is a schematic, cross-sectional view of a filter film of the display of FIG. 4 taken along lines V-V of FIG. 4.
Figure 6:
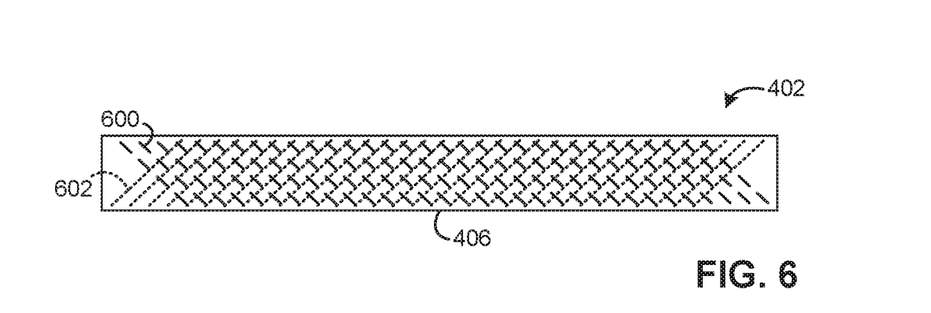
FIG. 6 is a schematic, cross-sectional view of a filter film of the display of FIG. 4 taken along lines VI-VI of FIG. 4.

FIGS. 5 and 6 are cross-sectional views of the display module 400 of FIG. 4 to schematically depict the filter 402 in greater detail. The cross-sectional views are taken along the width and height dimensions of the viewing area of the display module 400 of FIG. 4. FIG. 5 schematically depicts two sets of Bragg grating structures 500, 502 directed to providing, for instance, left-right privacy filtering for the display module 400. FIG. 6 schematically depicts another two sets of Bragg grating structures 600, 602 directed to providing, for instance, up-down privacy filtering for the display module 400. The grating structures of one cross-sectional view are not shown in the other cross-sectional view for ease in illustration.

As shown in each cross-sectional view, the Bragg grating structures 500 are disposed in respective planes, each of which is oriented in a respective direction. The Bragg grating structures 502 are similarly disposed in respective planes, and likewise for the other Bragg grating structures 600, 602. In the example of FIGS. 5 and 6, the respective planes of the different sets are oriented at different angles within the film 406 relative to the surface normal. In this example, the extent to which the angles are offset from the surface normal varies between the sets. The planes of the structures 600, 602 are more upright, or closer to the surface normal, than the planes of the structures 500, 502. As a result, the angles at which the privacy filtering occurs for the left-right viewers differs from the angles (and wavelengths) at which the privacy filtering occurs for the up-down viewers. The wavelengths reflected by the Bragg grating structures 500, 502, 600, 602 depends on the spacing between the planes, which may or may not differ between the sets.

In other cases, the spacing between adjacent structures may alternatively or additionally be varied between or within sets to tune the filter 402 (FIG. 4) to suppress or block a desired range of angles and wavelengths.

The thickness T (FIG. 5) of the film 406 may also be adjusted to establish the breadth of the range of angles suppressed or blocked by the filter 402. The breadth of the range increases as an increase in thickness allows the length of the structures to increase. The length of the structures 500, 502, 600, 602 may be used to determine the breadth of the angular range. A longer structure provides more opportunity for reflection at either end of the structure. The breadth of the angular range may thus be customized or otherwise selected for a particular off-axis viewing direction (e.g., left, right, up, down).

Figure 7:
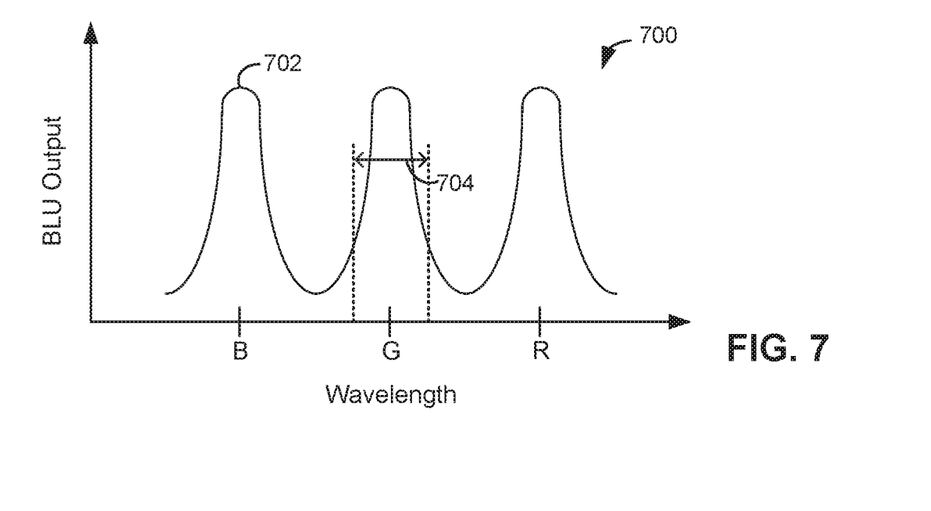
FIG. 7 is a graphical plot of backlight unit output as a function of wavelength in accordance with one example.

FIG. 7 is a graphical plot 700 of an example backlight output spectrum 702 to depict the manner in which the above-described filters provide privacy filtering in an angular- and wavelength-specific manner. In this example, the backlight unit generates light in multiple color bands, e.g., one for each display color—blue (B), green (G), and red (R). One or more Bragg grating sets of the filter are tuned or configured to reflect light within a wavelength range 704 for certain off-axis angles (e.g., 30 degrees plus/minus 5 degrees). In this example, the wavelength range 704 corresponds with, and/or is aligned with, the green band.

The filter also blocks or suppresses wavelengths at other incidence angles, including light propagating on-axis (0 degree incidence angle). One or more of the Bragg grating sets are accordingly also tuned or configured such that on-axis light is reflected within a wavelength range that avoids affecting on-axis luminance. In this example, the wavelengths in that range fall between the blue and green bands, as shown in the example of FIG. 8.

Figure 8:
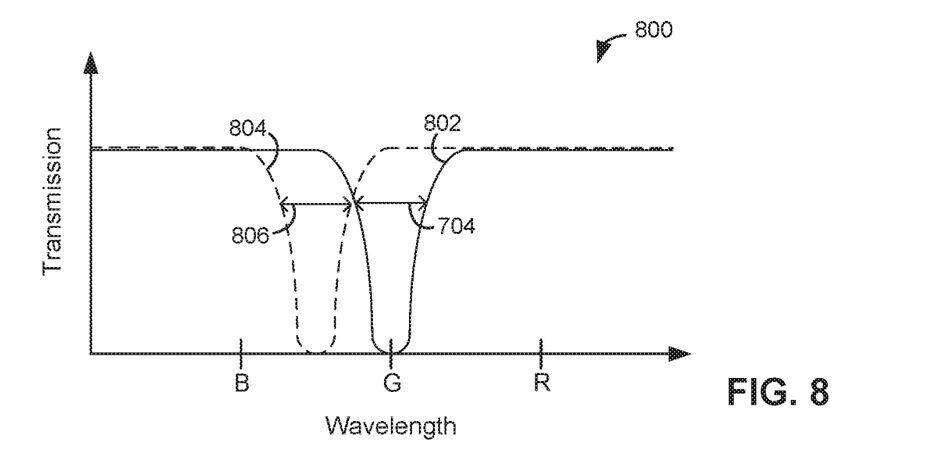
FIG. 8 is a graphical plot of filter transmission as a function of wavelength for two different propagation angles in accordance with one example.

FIG. 8 is a graphical plot 800 to depict the manner in which the filter response (transmission) characteristic shifts for a given propagation angle. The graphical plot 800 includes a response curve 802 for off-axis light incident upon the filter at a 30 degree angle, and a response curve 804 for on-axis light, e.g., incident upon the filter at a 0 degree angle. The response curve 802 shows how the blocked wavelength range 704 for the 30 degree off-axis light blocks the wavelengths at and near the green portion of the spectrum, but is transparent for all of the other wavelengths. In contrast, the response curve 804 is shifted in the wavelength domain due to the different propagation angle (0 degrees). The Bragg grating set is tuned such that a wavelength range 806 is suppressed or blocked for the on-axis light. In this example, the wavelength range 806 falls in between the blue and green portions of the spectrum. Reflection at the wavelengths in the range 806 does not affect the output of the display because those wavelengths are not generated (or at least not significantly generated) by the backlight unit (as shown in FIG. 7) or otherwise relied upon by the display.

Figure 9:
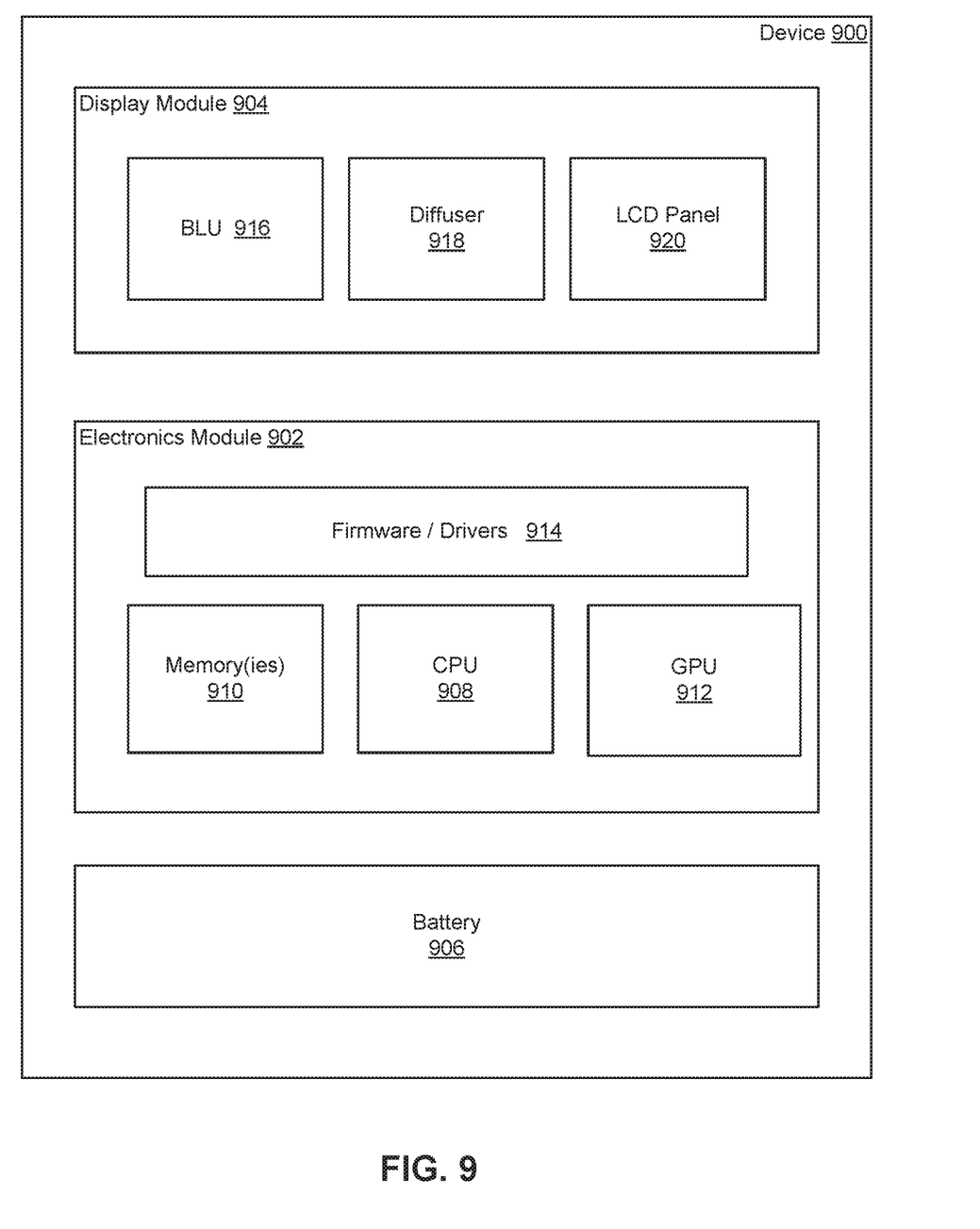
FIG. 9 is a block diagram of an electronic device having a display with integrated privacy filtering in accordance with one example.

FIG. 9 shows an exemplary electronic device 900 with an electronics module 902 and a display module 904 (or subsystem), and a battery 906. The electronic device 900 may include additional, fewer, or alternative components. For example, the display module 904 may be integrated with the electronics module 902 and/or other components of the electronic device 900 to a varying extent. For instance, the electronics module 902 and/or the display module 904 may include a graphics subsystem of the electronic device 900. Any number of display modules or systems may be included. In this example, the device 900 includes a processor 908 and one or more memories 910 separate from the display module 904. The processor 908 and the memories 910 may be directed to executing one or more applications implemented by the device 900. The display module 904 generates a user interface for an operating environment (e.g., an application environment) supported by the processor 908 and the memories 910. The processor 908 may be a general-purpose processor, such as a central processing unit (CPU), or any other processor or processing unit. Any number of such processors or processing units may be included.

In the example of FIG. 9, the electronics module 902 includes a graphics processing unit (GPU) 912 and firmware and/or drivers 914. The GPU 912 may be dedicated to graphics- or display-related functionality and/or provide general processing functionality. Some of the components of the electronics module 902 may be integrated. For example, the processor 908, the one or more of the memories 910, the GPU 912, and/or the firmware 914 may be integrated as a system-on-a-chip (SoC) or application-specific integrated circuit (ASIC). The electronics module 902 may include additional, fewer, or alternative components. For example, the electronics module 902 may not include a dedicated graphics processor, and instead rely on the CPU 908 or other general-purpose processor to support the graphics-related functionality of the electronic device 900. The electronics module 902 may include additional memory (or memories) to support display-related processing.

In the example of FIG. 9, the display module 904 includes a backlight unit (BLU) 916, a switchable diffuser 918, and an LCD panel or unit 920. The backlight unit 916, the diffuser 918, and/or the LCD unit 920 may be configured in accordance with one of the examples described above to provide integrated, switchable privacy filtering via Bragg grating-based filters disposed between the backlight unit 916 and the LCD panel 920, as described above. Additional, fewer, or alternative display components may be provided. For example, in some cases, the display module 904 includes a touch sensor unit.

The device 900 may be configured as one of a wide variety of computing devices, including, but not limited to, handheld or wearable computing devices (e.g., tablets and watches), communication devices (e.g., phones), laptop or other mobile computers, personal computers (PCs), and other devices. The device 900 may also be configured as an electronic display device, such as a computer monitor, a television, or other display or visual output device. In such cases, the device 900 may not include one or more of the above-described components, such as the battery 906.

In one aspect, a display includes a display modulation layer, a backlight unit configured to generate light for illumination of the display modulation layer, and a filter disposed between the backlight unit and the display modulation layer. The filter includes a plurality of Bragg grating sets. Each Bragg grating set is configured to reflect the light in a wavelength-selective and angular-selective manner rearward toward the backlight unit.

In another aspect, a display includes a liquid crystal display (LCD) layer, a backlight unit configured to generate light for illumination of the LCD layer, and a photonic lattice filter film disposed between the backlight unit and the LCD layer. The photonic lattice filter film includes a plurality of Bragg grating sets. Each Bragg grating set is configured to reflect a bandwidth of the light rearward toward the backlight unit when propagating at off-axis angles beyond a predetermined range of viewing angles for the display.

In yet another aspect, a display includes a display modulation layer, a backlight unit configured to generate light for illumination of the display modulation layer, a filter film disposed between the backlight unit and the display modulation layer, and a switchable diffuser layer disposed between the filter film and the display modulation layer. The filter film includes a plurality of Bragg grating sets. Each Bragg grating set is configured to reflect a bandwidth of the light rearward toward the backlight unit when propagating at off-axis angles beyond a predetermined range of viewing angles for the display.

In connection with any one of the aforementioned aspects, the display may alternatively or additionally include any combination of one or more of the following aspects or features. The display further includes a diffuser layer disposed between the filter and the display modulation layer, the diffuser layer being switchable between an operative mode and an inoperative mode. The diffuser layer includes a polymer network liquid crystal film. The filter includes switchable Bragg gratings, the switchable Bragg gratings configured to switch between a reflective mode and a transparent mode. The light generated by the backlight unit includes first and second color bands. Each Bragg grating set is configured to reflect at wavelengths between the first and second color bands when the light is propagating along a normal of the display. The display modulation layer defines first through fourth borders of a display area of the display. A respective Bragg grating set of the plurality of Bragg grating sets is configured to reflect a bandwidth of the light propagating at off-axis angles toward each respective one of the first through fourth borders of the display area. The off-axis angles are beyond a predetermined range of viewing angles for the display. At least one Bragg grating set of the plurality of Bragg grating sets is configured as a chirped grating set. At least one Bragg grating set of the plurality of Bragg grating sets is patterned to generate an off-axis image. The display modulation layer includes a liquid crystal display (LCD) layer.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A display comprising:
a display modulation layer;
a backlight unit configured to generate light for illumination of the display modulation layer;
a filter disposed between the backlight unit and the display modulation layer wherein the filter passes a first portion of the light from the backlight unit including light rays that are off-axis from a surface normal of the filter; and
a diffuser layer disposed between the filter and the display modulation layer, the diffuser layer being switchable between a transmissive mode and a diffusive mode, wherein the diffuser layer is in the diffusive mode based at least in part on the application of power, and in the transmissive mode based at least in part on power not being applied thereto, and wherein the transmissive mode does not substantially alter a path of the first portion of the light from the backlight unit irrespective of angle of the path of the first portion of the light relative to the diffuser layer passed by the filter to the diffuser layer;
wherein the filter comprises a plurality of Bragg grating sets, and
wherein each Bragg grating set is configured to reflect a second portion of the light in a wavelength-selective and angular-selective manner rearward toward the backlight unit.

2. The display of claim 1, wherein the diffuser layer comprises a polymer network liquid crystal film.

3. The display of claim 1, wherein:
the light generated by the backlight unit includes first and second color bands; and
each Bragg grating set is configured to reflect at wavelengths between the first and second color bands when the light is propagating along a normal of the display.

4. The display of claim 1, wherein:
the display modulation layer defines first through fourth borders of a display area of the display;
a respective Bragg grating set of the plurality of Bragg grating sets is configured to reflect a bandwidth of the light propagating at off-axis angles toward each respective one of the first through fourth borders of the display area; and
the off-axis angles are beyond a predetermined range of viewing angles for the display.

5. The display of claim 1, wherein at least one Bragg grating set of the plurality of Bragg grating sets is configured as a chirped grating set.

6. The display of claim 1, wherein at least one Bragg grating set of the plurality of Bragg grating sets is patterned to generate an off-axis image.

7. The display of claim 1, wherein the display modulation layer comprises a liquid crystal display (LCD) layer.

8. A display comprising:
a liquid crystal display (LCD) layer;
a backlight unit configured to generate light for illumination of the LCD layer
a photonic lattice filter film disposed between the backlight unit and the LCD layer wherein the filter passes a first portion of the light from the backlight unit including light rays that are off-axis from a surface normal of the filter; and a diffuser layer disposed between the photonic lattice filter film and the LCD layer, the diffuser layer being switchable between a transmissive mode and a diffusive mode, wherein the diffuser layer is in the diffusive mode based at least in part on the application of power, and in the transmissive mode based at least in part on power not being applied thereto, and wherein the transmissive mode does not substantially alter a path of the first portion of the light from the backlight unit irrespective of angle of the path of the first portion of the light relative to the diffuser layer passed by the filter to the diffuser layer;
wherein the photonic lattice filter film comprises a plurality of Bragg grating sets, and
wherein each Bragg grating set is configured to reflect a bandwidth of the second portion of the light rearward toward the backlight unit when propagating at off-axis angles beyond a predetermined range of viewing angles for the display.

9. The display of claim 8, wherein the transmissive mode does not substantially alter the path of the light from the backlight unit irrespective of angle of the path of the light relative to the diffuser layer.

10. The display of claim 8, wherein:
the light generated by the backlight unit includes first and second color bands; and
each Bragg grating set is configured to reflect at wavelengths between the first and second color bands when the light is propagating along a normal of the display.

11. The display of claim 8, wherein:
the LCD layer defines first through fourth borders of a display area of the display;
a respective Bragg grating set of the plurality of Bragg grating sets is configured to reflect a bandwidth of the light propagating at an off-axis angles toward a respective one of the first through fourth borders of the display area; and
the off-axis angles are beyond a predetermined range of viewing angles for the display.

12. The display of claim 8, wherein at least one Bragg grating set of the plurality of Bragg grating sets is configured as a chirped grating set.

13. The display of claim 8, wherein at least one Bragg grating set of the plurality of Bragg grating sets is patterned to generate an off-axis image.

14. A display comprising:
a display modulation layer;
a backlight unit configured to generate light for illumination of the display modulation layer;
a filter film disposed between the backlight unit and the display modulation layer wherein the filter passes a first portion of the light from the backlight unit including light rays that are off-axis from a surface normal of the filter; and
a switchable diffuser layer disposed between the filter film and the display modulation layer, the diffuser layer being switchable between a transmissive privacy mode and a diffusive mode, the transmissive privacy mode having a viewing angle of less than about 30°, wherein the diffuser layer is in the diffusive mode based at least in part on the application of power, and in the transmissive mode based at least in part on power not being applied thereto, and wherein the transmissive mode does not substantially alter a path of the first portion of the light from the backlight unit irrespective of angle of the path of the first portion of the light relative to the diffuser layer passed by the filter to the diffuser layer and the light generated by the backlight unit is not visible outside of the viewing angle;

wherein the filter film comprises a plurality of Bragg grating sets, and wherein each Bragg grating set is configured to reflect a bandwidth of a second portion of the light rearward toward the backlight unit when propagating at off-axis angles beyond a predetermined range of viewing angles for the display.

15. The display of claim 14, wherein:

the light generated by the backlight unit includes first and second color bands; and each Bragg grating set is configured to reflect at wavelengths between the first and second color bands when the light is propagating along a normal of the display.

16. The display of claim 14, wherein:

the display modulation layer defines first through fourth borders of a display area of the display;

a respective Bragg grating set of the plurality of Bragg grating sets is configured to reflect a bandwidth of the light propagating at an off-axis angles toward a respective one of the first through fourth borders of the display area; and the off-axis angles are beyond a predetermined range of viewing angles for the display.

17. The display of claim 14, wherein at least one Bragg grating set of the plurality of Bragg grating sets is configured as a chirped grating set.

18. The display of claim 14, wherein at least one Bragg grating set of the plurality of Bragg grating sets is patterned to generate an off-axis image.

19. The display of claim 1, wherein the filter passes the first portion of the light with a horizontal viewing angle and a vertical viewing angle, the horizontal viewing angle and the vertical viewing angle being different.

20. The display of claim 19, wherein the horizontal viewing angle is greater than the vertical viewing angle.

* * * * *